United States Patent [19]

Dugre

[11] Patent Number: 4,535,394

[45] Date of Patent: Aug. 13, 1985

[54] VARIABLE COLOR FLOODLIGHT

[76] Inventor: Michael A. Dugre, 1218 Hawkes St., Orlando, Fla. 32809

[21] Appl. No.: 559,298

[22] Filed: Dec. 8, 1983

[51] Int. Cl.³ ............................................ H05B 41/34
[52] U.S. Cl. .................................. 362/231; 362/233; 362/293
[58] Field of Search ............... 362/233, 231, 239, 286, 362/293, 319, 386, 419, 253, 312, 313, 314, 315, 316, 317, 324

[56] References Cited

U.S. PATENT DOCUMENTS

| | | | |
|---|---|---|---|
| 3,611,603 | 10/1971 | Genser, III | 362/231 |
| 3,816,739 | 6/1974 | Stolov | 362/233 |
| 4,071,809 | 1/1978 | Weiss et al. | 362/231 |
| 4,380,791 | 4/1983 | Nishizawa | 362/231 |
| 4,392,187 | 7/1983 | Bornhorst | 362/233 |
| 4,454,570 | 6/1984 | Morello | 362/231 |
| 4,488,207 | 12/1984 | Harmon | 362/293 |

Primary Examiner—Raymond A. Nelli

[57] ABSTRACT

A lighting system for use with a spotlight or floodlight in which the color of the light may be continuously varied. Red, blue, and green collimated light sources are provided adjacent a pyramidal mirror assembly having a set of crossed dichroic filters. One dichroic filter passes red and green light and reflects blue light; the other dichroic filter passes blue and green light and reflects red light. The dichroic mirrors serve to direct the red, blue, and green light beams from the sources to one mirror of the mirror assembly which reflects a composite beam produced by the addition of the three primary color components. Individual intensity controls are provided for the three light sources permitting a continuous variation in color of the composite beam.

12 Claims, 8 Drawing Figures

FROM POWER SOURCE

VARIABLE COLOR FLOODLIGHT

BACKGROUND OF THE INVENTION

1. Field of the Invention

The present invention relates to a variable color lighting system, and more particularly to a spotlight or floodlight system in which the color of the light may be continuously varied.

2. Description of the Prior Art

The use of colored lights for displays, theatrical productions, and similar activities is necessary in which the color of the light can be varied from time to time. In the prior art, such variations have normally been provided by using separate spotlights or floodlights for each color and fading the units in and one out. Other methods include the use of colored filters, such as gelatin and the like, which are sequentially placed in front of a white light source. However, these techniques permit changing of color only in discrete steps and is not easily adaptable to provide a continuous color variation.

It is known, for relatively small light sources such as for photographic enlargement of color negative films, to provide continuously variable colored light. In U.S. Pat. No. 3,818,216 to Larraburu, a broad spectrum tungsten lamp has its intensity manually controlled. A complex arrangement of dichroic mirrors is utilized which separates the spectrum of the lamp into three colors. Each color has an individual attenuation device to control the intensity of the individual colors. The colors are then recombined through a lenticular lens system to provide a uniform output beam in which the color content and intensity can be manually controlled. Reynolds, in U.S. Pat. No. 3,825,335, teaches a system having three different colored light sources and forms bundles of fiber optic transmission cables having individual fibers attached to each of the colors for combining the three colors. Thus, the output at the end of a fiber bundle will produce an additive mixture of the colors. By individually adjusting the intensity of each colored light source, the composite color can be varied. A computer-controlled lighting system which includes variable color and intensity is taught in U.S. Pat. No. 4,392,187 to Bornhorst. The system uses four dichroic filters which are pivoted in various combinations so as to transmit a preselected color.

None of this known art teaches a spotlight or floodlight device suitable for theatrical use which is easily controlled in intensity and whose spectrum may be controlled continuously over the visible color spectrum.

SUMMARY OF THE INVENTION

The present invention provides a variable color light source which is the basis for a spotlight or a floodlight having continuously variable color output. In one version of my invention, three individual light sources are used in which each source produces a wide spectrum light. Each light source is filtered to produce one of the three primary additive colors—red, blue, and green. A pair of crossed dichroic filters is provided with one filter selected to reflect only the red light and the other filter to reflect only the blue light. Each filter will pass the green light without reflection. The light from the green light source is focused and collimated into a sharply defined beam which is directed onto the crossed dichroic filters such that the central beam axis passes through the line of crossing of the filters and at a 45° angle to the surface of each. As will be understood, the green light beam will pass through the red-reflecting and blue-reflecting filters. The red light source is focused, collimated and directed to impinge on the red reflecting surface of the red dichroic filter; and the blue light source is focused, collimated, and directed to impinge on the blue reflecting surface of the blue dichroic filter. Both the red beam and the blue beam are oriented at 45° to their respective reflecting filters such that both the red light and the blue light are reflected at 90° with their reflected beams parallel with the beam of the green light source.

Each primary light source includes a variable intensity control. For example, where high intensity incandescent light sources are used, a rheostat or the like may be utilized to vary the light output over the range of intensities for which the light maintains sufficient spectral purity. As will be understood, at some level of intensity of the three beams, the light will add to produce an essentially white light. As the intensity of one or more of the light sources is varied, the resulting additive light will change in its color. Thus, with suitable control of the three colored light sources, almost any color can be obtained.

In the preferred embodiment of my invention, I utilize a novel pyramidal mirror or reflector assembly and a set of crossed dichroic filters disposed within the interior of the pyramidal mirror assembly, forming four triangular reflecting and filtering chambers. The three color light sources are suitably packaged, including necessary color filters and lenses, and disposed in front of three of the reflecting chambers. As will be shown in more detail hereinafter, the pyramidal mirrors reflect the respective colors to the dichroic filters which either pass or reflect the light, depending on its color. The arrangement is such that the three different colored light beams are all reflected in coincidence into the fourth chamber. The mirror in the fourth chamber serves to reflect the composite beam outward. A lens system is disposed in front of the output chamber for forming the desired final color beam. As may now be understood, varying the intensity of the three color sources causes the composite output beam to vary in color.

My color light system, through the use of the folded beam configuration described above, can be built into a compact unit which is convenient for use in stage shows and the like and which will eliminate the large numbers of light sources and filters necessary in the prior art for such purpose.

It is therefore a principal object of my invention to provide a spotlight or floodlight system in which the color of the output light may be continuously varied.

It is another object of my invention to provide a variable color light source suitable for use with theatrical productions and the like.

It is yet another object of my invention to produce a variable color spotlight or floodlight using the additive color process in which each of the three primary additive colors are present and the intensity of each can be independently varied.

It is still another object of my invention to provide a variable color light source in which the three additive color light beams are focused onto a reflecting mirror via dichroic reflecting filters.

These and other objects and advantages of my invention will become apparent from the following detailed

DETAILED DESCRIPTION OF THE PREFERRED EMBODIMENT

Figure 1:
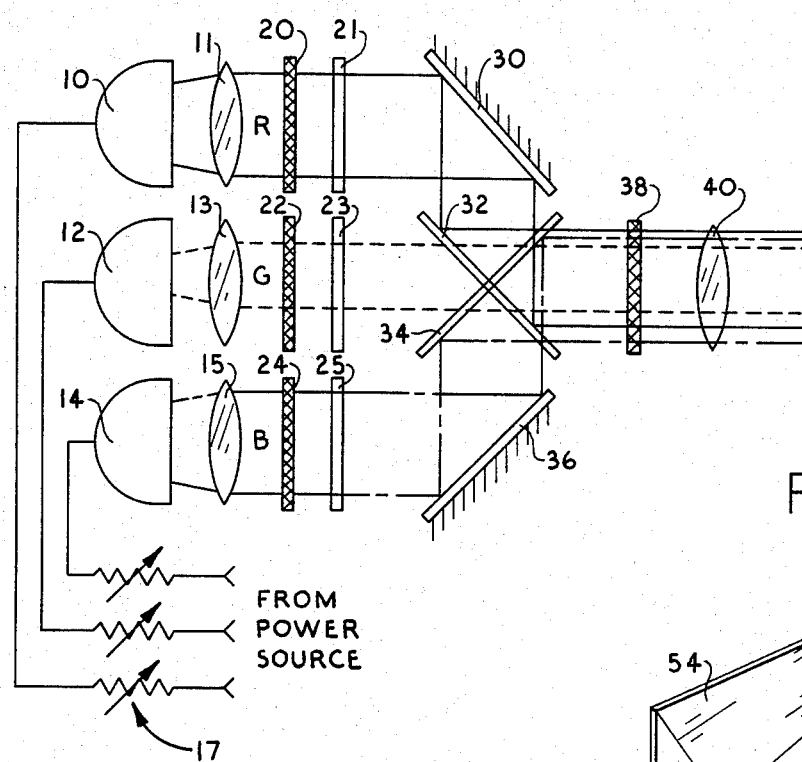
FIG. 1 is a simplified schematic diagram of a system illustrating the principle of operation of my invention.

Turning first to FIG. 1, I have shown a schematic diagram illustrating the principle of my variable color spotlight or floodlight. Three white light sources 10, 12, and 14 are shown connected to an electrical power source through a set of rheostats 17 to permit individual control of the intensity of the associated light source. The light from each source is focused by a lens assembly shown schematically at 11, 13, and 15 through color filters 20, 22, and 24, respectively. Assuming filter 20 will pass only a narrow portion of the spectrum in the red region, a red collimated light beam from that source falls on mirror 30 at a 45° angle. Similarly, the blue collimated beam from light source 14 passing through blue filter 24 falls on mirror 36 at a 45° angle. Between the two reflectors 30 and 36 is a pair of crossed dichroic reflecting filters 32 and 34. Filter 32 will reflect light in the red portion of the spectrum but will pass all other colors. Dichroic filter 34 will reflect light in the blue portion of the spectrum and pass all other colors. As may now be noted, the green light beam from light source 12 will pass through both red dichroic filter 32 and blue dichroic filter 34 without reflection.

The light beam from source 10, reflected from reflecting surface 30, strikes the red dichroic filter element at a 45° angle which will therefore reflect that beam at 90°. Similarly, the beam from light source 14 is reflected from mirror 36 to dichroic filter 34 which will also be reflected 90°. Thus, the red, green, and blue beams will add at the output. A lens assembly shown schematically at 40 focuses and collimates the composite beam. A neutral density filter 38 may also be utilized in the output optical system to control the composite light intensity if desired.

The user can independently vary the intensity of light sources 10, 12, and 14 through the use of the respective rheostats 17 and thereby change the light color from white, when all of the colors are of equal intensity, through the various intermediate shades to any of the primary colors. Thus, a continuum of color changes is available to the operator. Although the intensity of the beam will also vary with the brightness of the light sources, the output light can be maintained at a uniform density with color changes, by utilizing a variable neutral density filter at 38.

An alternative arrangement for varying the intensity of each light source 10, 12, and 14 is also shown schematically in FIG. 1. A variable neutral density filter 21, 23, and 25 is provided for the red, green, and blue light sources respectively. Thus, the individual intensities may be independently controlled.

Although the arrangement of FIG. 1 is a practical system, the size of the completed unit would be unnecessarily bulky. I have developed a novel folded beam system which greatly reduces the size of an operative floodlight or spotlight.

Figure 2:
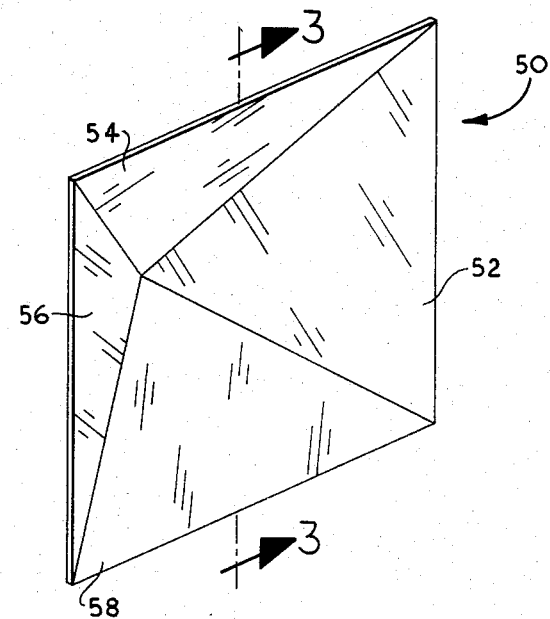
FIG. 2 is a perspective view of the pyramidal reflector used in the preferred embodiment of my invention.
Figure 3:
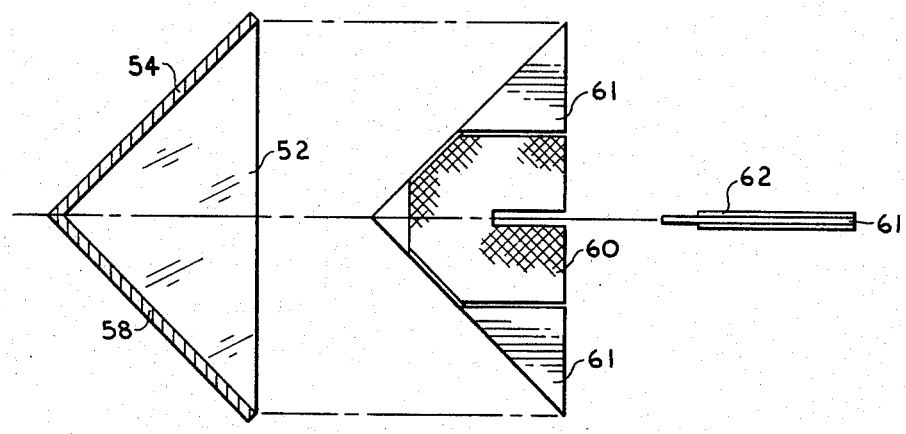
FIG. 3 shows a cross sectional view of the reflector of FIG. 2 and a pair of dichroic reflecting filters shown in exploded view used with the reflector.
Figure 4:
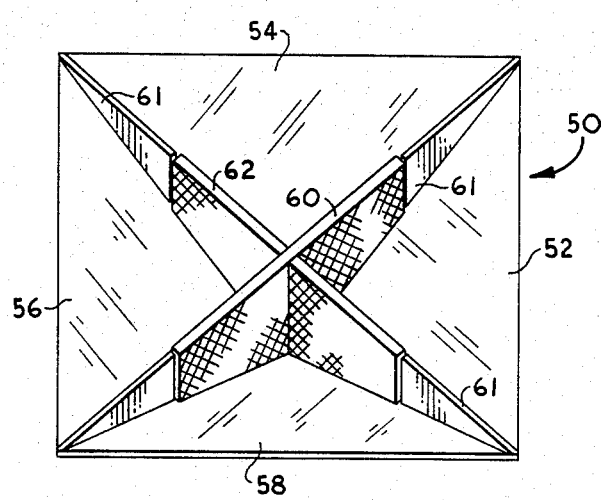
FIG. 4 is a perspective view of the reflector and dichroic reflecting filters of FIG. 3 in the assembled condition.

In FIG. 2, a reflector 50 is shown which permits a very compact embodiment of my invention to be fabricated. Reflector 50 comprises four equal sized isosceles triangle-shaped mirrors or reflectors 52, 54, 56, and 58. Opposing reflector sections form a 90° angle as best seen in FIG. 3 which shows a cross section through plane 3—3 of FIG. 2. A pair of dichroic reflector filters 60 and 62 are installed in reflector 50 as seen in the perspective view of FIG. 4 and in exploded view in FIG. 3. Dichroic reflector filter 60 reflects blue light and passes other colors, while reflector filter 62 reflects red light and passes other colors. Dichroic filters 60 and 62 are supported by plates 61 which may be of aluminum or other suitable material.

Figure 5:
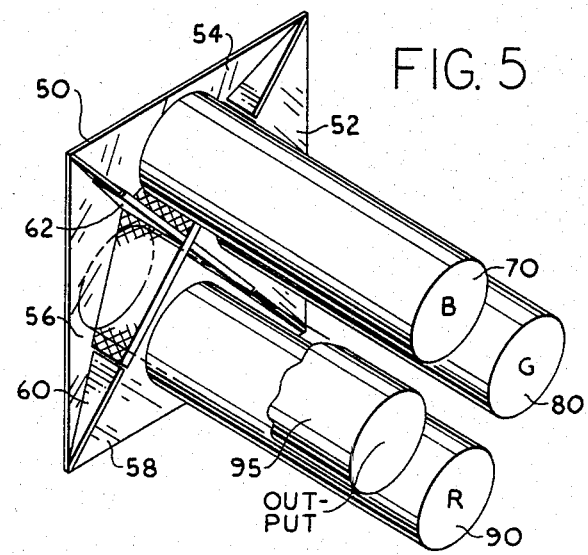
FIG. 5 is a perspective view of the reflector assembly of FIG. 4 with the three primary color light sources shown in operative position but with the supporting structure omitted for clarity and with the light output lens assembly shown in partially cut-away view.

Turning now to FIG. 5, the arrangement of the light sources and the output lens system is shown. Light source 90, which contains the necessary white light source, red filter, and collimating lenses, is disposed adjacent reflector 58; the green light source 80, which contains the light source, the green filter, and the collimating lens assembly, is disposed adjacent reflector 52; and the blue light source 70, which contains the light source, the blue filters, and the collimating lenses, is disposed adjacent reflector 54. In a manner described below, the collimated light beams from each of the sources 70, 80, and 90 are transmitted to impinge on mirror 56 and to be reflected therefrom through output lens system 95 which is shown cut-away for clarity. Lens system 95 may include collimating lenses, irises, neutral density filters, and the like as will be clear to those of skill in the art.

Figure 6:
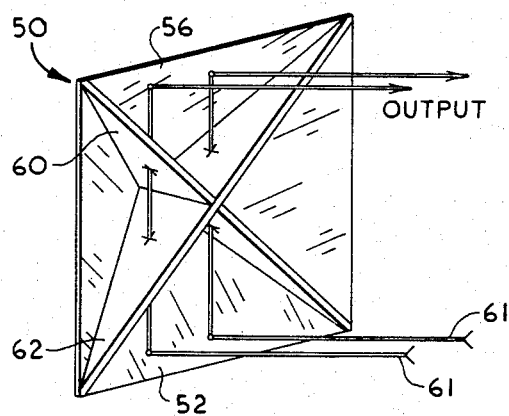
FIGS. 6, 7, and 8 are perspective views of the reflector assembly of the invention showing in stylized form three colored light beams incident on the reflector and indicating the manner in which the beams are reflected from the output mirror with FIG. 6 showing green beams, FIG. 7 showing red beams, and FIG. 8 showing blue beams.
Figure 7:
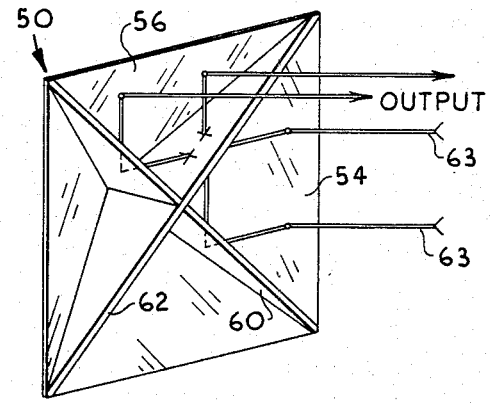
Figure 8:
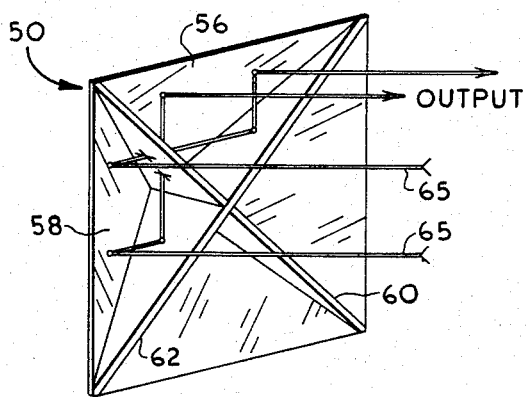

FIGS. 6, 7, and 8 illustrate diagrammatically the manner in which the reflector assembly 50 and the dichroic filters 62 and 60 work in combination to produce a composite light beam. In FIG. 6, assume rays 61 are light rays from the green light source 80 incident on reflector 52. Due to the 45° angle of reflector 52 with respect to the input light ray, these rays will be reflected at 90° and will pass through the red and blue dichroic filters 60 and 62. Thereafter, beams 61 strike reflector 56 at a 45° angle and are therefore reflected 90° in the direction of the output.

In FIG. 7, blue input light rays 63 from blue light source 70 strike reflector 54 and are reflected at right angles. One ray is shown striking blue dichroic filter 60 at a 45° angle. Since this dichroic filter reflects blue light, the light ray is reflected at 90° passing through red dichroic filter 62 to reflector 56 again at a 45° angle causing 90° reflection of the blue beam 63. The other ray passes first through red filter 62 and is reflected from blue filter 60.

In FIG. 8, one red input 65 from red light source 90 strikes reflector 58, is reflected 90° to red dichroic filter 62, and is reflected at 90° by that surface, thereafter passing through blue dichroic filter 60 and being reflected at 90° by reflector 56. The other red beam 65 passes through blue filter 60 to be reflected from red filter 62 to output mirror 56. As will now be seen, the three colored light rays 61, 63, and 65 are each reflected in parallel from output reflector 56. When the entire collimated beam of each light source is considered, it will be seen that these beams will be superimposed at the output and will therefore produce the desired additive color dependent upon the intensity of the three components.

As will now be recognized, a novel apparatus suitable for use as a floodlight or spotlight has been disclosed in which the color of the light beam may be varied through a continuum of color without change of filters. Through the use of dichroic mirrors in a folded beam configuration, a compact lighting unit may provided.

Although the preferred embodiment of my invention has been described in detail, it will be obvious to those of skill in the art to make various modifications and substitutions in materials, elements, and configuration without departing from the spirit and scope of the invention.

I claim:
1. A variable color lighting system comprising:
   a variable intensity source of red light;
   a variable intensity source of green light;
   a variable intensity source of blue light;
   a first mirror disposed adjacent said red light source for reflecting a beam of red light from said red light source;
   a second mirror disposed adjacent said blue light source for reflecting a beam of blue light from said blue light source;
   a first dichroic mirror disposed to reflect said red light beam from said first mirror to form a red component of an output beam, to pass a beam of green light from said green light source therethrough to form a green component of said output beam, and to pass said blue light beam therethrough;
   a second dichroic mirror disposed to reflect said blue light beam from said second mirror to form a blue component of said output beam, and to pass said beam of green light from said green light source therethrough, and to pass said red light beam therethrough, and in which said second dichroic mirror and said first dichroic mirror are crossed;
   said first dichroic mirror disposed at right angles to said second dichroic mirror to cause said red output beam component, said blue output beam component, and said green light beam to be superimposed forming an additive output beam;
   control means associated with said red, green, and blue light sources for independently varying the intensity of each of said sources, thereby varying the color of said output beam.
2. The system as defined in claim 1 in which said variable intensity source of red light includes a first wide spectrum light source, a red filter, and a first set of collimating lenses for collimating said beam of red light;
   said variable intensity source of green light includes a second wide spectrum light source, a green filter, and a second set of collimating lenses for collimating said beam of green light;
   said variable intensity source of blue light including a third wide spectrum light source, a blue filter, and a third set of collimating lenses for collimating said beam of blue light; and
   said control means includes first intensity control means for controlling the brightness of said first wide spectrum light source, second intensity control means for varying the intensity of said second wide spectrum light source, and third intensity contol means for varying the intensity of said third wide spectrum light source.
3. The system as defined in claim 2 in which said first, second, and third wide spectrum light sources are incandescent lamps; and
   in which said first, second, and third intensity control means are rheostats connected to respective first, second, and third incandescent lamps.
4. The system as defined in claim 2 in which said first, second, and third intensity control means includes three variable neutral density filters, one of said filters disposed adjacent each of said wide spectrum light sources.
5. The system as defined in claim 1 which further includes a set of collimating lenses disposed adjacent said first and second dichroic mirrors for collimating said composite beam.
6. A variable color lighting system comprising:
   a reflector assembly having four equal isosceles triangular-shaped mirrors joined to form a square four-sided pyramid in which each opposed pair of said mirrors forms a right angle therebetween;
   a pair of planar dichroic filters crossed at right angles having a first one of said pair for passing green light and blue light therethrough and for reflecting red light therefrom, and a second one of said pair for passing green light and red light therethrough and for reflecting blue light therefrom, said pair of crossed dichroic filters disposed within said pyramid with said first filter forming a diagonal between one pair of opposite corners of said square pyramid and said second filter forming a diagonal between the other pair of opposite corners of said square pyramid;
   first light source means for producing a collimated beam of red light, said first light source means disposed adjacent a first one of said triangular mirrors to cause a said red beam to impinge on said first triangular mirror at a 45° angle, said first triangular mirror reflecting a first portion of said red beam to impinge on said first dichroic filter at a 45° angle to be reflected therefrom at a 90° angle, thereafter to pass through said second dichroic filter to impinge on a second one of said trianglular mirrors to be reflected therefrom at a 90° angle, said first triangular mirror reflecting a second portion of said red beam to pass through said second dichroic filter and thereafter to impinge on said second triangular mirror at a 45° angle to thereafter be reflected at a 90° angle, said first and second portions of said beam of red light reflected from said second triangular mirror forming a red component of an output beam from said second triangular mirror;
   second light source means for producing a collimated beam of blue light, said second light source means disposed adjacent a third one of said triangular mirrors opposite to said first triangular mirror to cause said blue beam to impinge on said third tri- angular mirror at a 45° angle, said third mirror reflecting a first portion of said blue beam to impinge on said second dichroic mirror at a 45° angle to be reflected therefrom at a 90° angle and to thereafter pass through said first dichroic filter to impinge on said second triangular mirror to be thereafter reflected at a 90° angle, said third triangular mirror reflecting a second portion of said blue beam to pass through said first dichroic filter and to thereafter impinge on said second triangular mirror at a 45° angle to thereafter be reflected at a 90° angle, said first and second portions of said beam of blue light reflected from said second triangular mirror forming a blue component of an output beam from said second triangular mirror; and third light source means for producing a collimated beam of green light, said third light source means disposed adjacent a fourth one of said triangular mirrors opposite to said second triangular mirror to cause said green beam to impinge on said fourth triangular mirror at a 45° angle and to thereafter be reflected therefrom at a 90° angle, and thereafter to pass through said first and second dichroic filters to impinge on said second triangular mirror and thereafter to be reflected at a 90° angle forming a green component of said output beam from said second mirror;

whereby said red component of said output beam, said blue component of said output beam, and said green component of said output beam add to form a colored light beam which color is determined by the ratios of intensities of said red, blue, and green components.

7. The system as defined in claim 6 which further comprises:
first control means for varying the intensity of said first light source;
second control means for varying the intensity of said second light source; and
third control means for varying the intensity of said third light source.

8. The system as defined in claim 6 in which:
said first light source includes a first incandescent lamp and a first rheostat for controlling the brightness of said first lamp;
said second light source includes a second incandescent lamp and a second rheostat for controlling the brightness of said second lamp; and
said third light source includes a third incandescent lamp and a third rheostat for controlling the brightness of said third lamp.

9. The system as defined in claim 6 in which:
said first light source includes a first constant intensity lamp and a first variable density filter for controlling the brightness of said first constant intensity lamp;
said second light source includes a second constant intensity lamp and a second variable density filter for controlling the brightness of said second constant intensity lamp; and
said third light source includes a third constant intensity lamp and a third variable density filter for controlling the brightness of said third constant intensity lamp.

10. The system as defined in claim 6 which further includes a collimating lense system disposed adjacent said second triangular mirror for receiving and collimating said output beam from said second triangular mirror.

11. The system as defined in claim 10 in which said collimating lense system includes a variable density neutral filter for controlling the intensity of said output beam.

12. The system as defined in claim 6 in which said first light source includes a first set of collimating lenses;
said second light source includes a second set of collimating lenses; and
said third light source includes a third set of collimating lenses.

* * * * *